July 4, 1939.     E. H. MUELLER     2,164,419
GAS COCK OR THE LIKE
Filed Aug. 12, 1936

INVENTOR.
Ervin H. Mueller
BY Barnes, Kisselle, Laughlin & Raisch
ATTORNEY.

Patented July 4, 1939

2,164,419

UNITED STATES PATENT OFFICE 2,164,419

GAS COCK OR THE LIKE

Ervin H. Mueller, Detroit, Mich.

Application August 12, 1936, Serial No. 95,598

1 Claim. (Cl. 277—53)

This invention relates to a valve structure, and particularly to the so-called gas cock useful for controlling gas lines such as are used on gas ranges or the like.

The object of the invention is to provide an improved construction in a valve having a single outlet but which is so arranged that different adjustments of the valve open large and small gas passageways respectively for a full or low gas flame at the burner. To this end a valve is provided wherein a single port in one of the valve members takes care of both gas flow conditions by cooperation with at least two gas passageways in another valve member, and in which both passageways in the one valve member are, for a period simultaneously, open during the movement of the valve, so that the gas flow is at no time discontinued throughout the range of movement of the valve member from its "off" position to the opposite extreme position. Another object is the provision of a valve having a feature of safety in that an adjustable control member for the small gas passageway may also serve as a closing valve to prevent loss of the gas entirely should a condition arise for the use of the member as a closing valve. A still further object is the provision of a valve which has a relatively large reservoir for gas positioned to flow immediately to the burner when the valve is adjusted to the low flame position to insure a supply of gas to the burner at all times, regardless of how an operator may manipulate the movable valve member.

Figure 5:
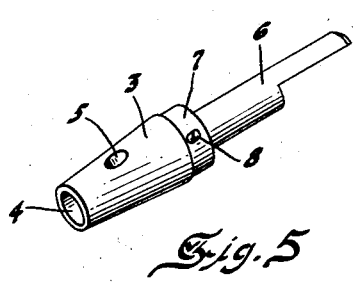
Fig. 5 is a perspective view of the valve plug or rotary valve member.

A valve incorporating the features of the invention is shown in the accompanying drawing and it has a valve body 1 provided with a chamber 2 which constitutes a valve seat. A valve member in the nature of a plug is shown in Fig. 5 and it has a portion 3 for fitting in the chamber, the portion having an axial bore 4 and a port 5 leading thereinto. The valve has a stem 6 for the reception of a handle, and it may be formed to have a shoulder 7 and a stop pin 8.

The valve body is provided with an extension 10 which may be screw threaded for attachment to a manifold or other gas supply conduit and which has an inlet passageway 11 leading to the chamber 2. The body also has an extension 12 provided with an outlet passageway 13 which connects into the chamber, and the end of the extension 12 may be provided with a jet cap 14 with a jet aperture 15 which may be more or less controlled by a pointed end or needle structure 16 which, for example, as shown, is integral with the extension 12, the extension 12 having apertures 17 for the flow of gas out of the passageway 13.

The valve body has an enlargement 20 and this is formed with a passageway 21 by drilling through the enlargement into the chamber 2. The chamber 21 constitutes a gas reservoir, as will presently be seen, and its outer end may be plugged as at 22. The enlargement 20 is drilled so as to intercept the chamber 21, thus to provide a relatively small passageway 23 extending into the inlet passageway 11, and an aperture 24 which may be larger than the passageway 23. The enlargement also has a recessed threaded extension 25, the extension being threaded in the form shown, both internally and externally.

A controlling valve takes the form of a needle member 26 having a pointed end for cooperation with the end of the passageway 23, a threaded body portion 26 which threads into the recess, and preferably an outer head 27 which may be roughened or knurled so as to be turned with the fingers. A coil spring 28 may be located in the recess in the extension 25 between the body of the valve and the threaded part 25.

A cap 30 may be employed and which is threaded over the extension 25, and it may be used in connection with a sealing washer 31.

Figure 1:
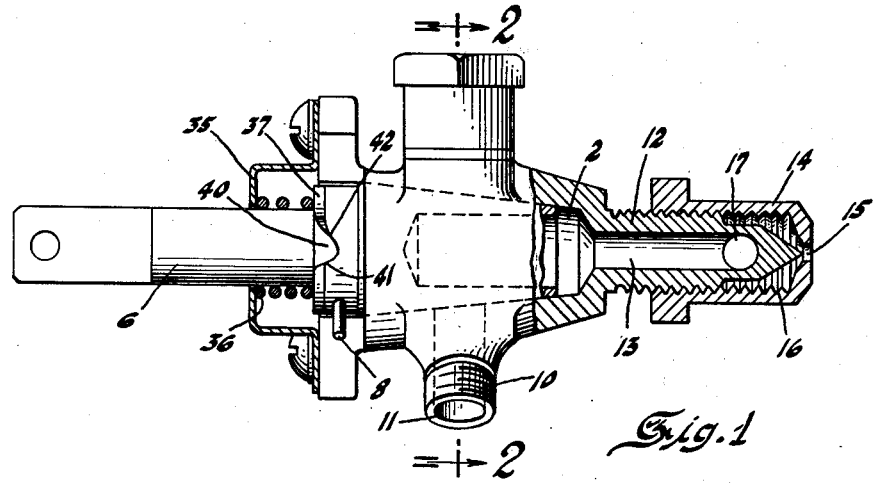
Fig. 1 is a view of a valve constructed in accordance with the invention illustrating some of the parts in cross section.
Figure 4:
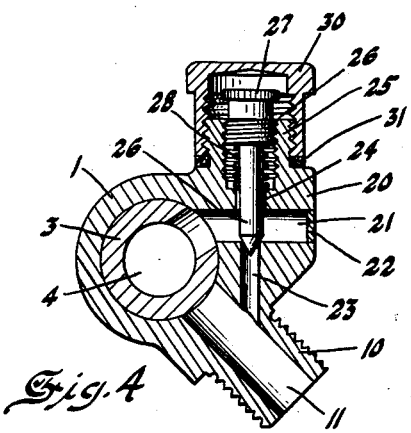
Fig. 4 is a cross sectional view similar to Figs. 2 and 3 illustrating the valve in low flame or simmering position.
Figure 3:
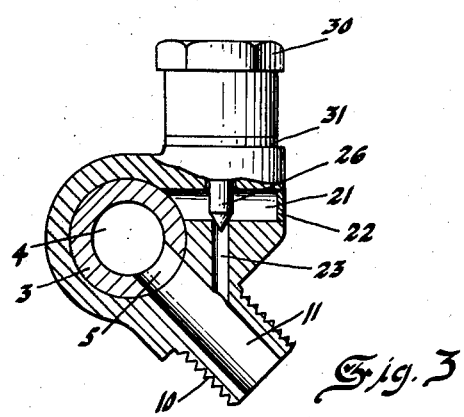
Fig. 3 is a cross sectional view similar to Fig. 2 illustrating the valve in full "on" position.
Figure 2:
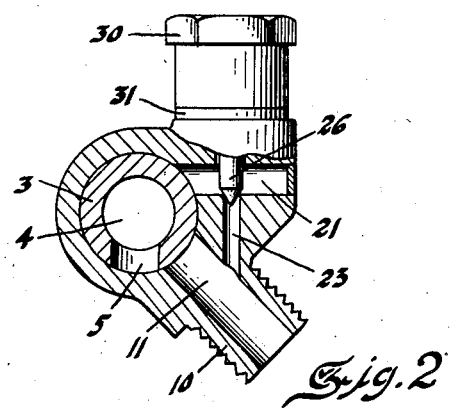
Fig. 2 is a cross sectional view taken substantially on line 2—2 of Fig. 1 showing the valve in "off" position.

In use the valve functions as follows: When the valve member 3 is turned clockwise, as Fig. 2 is viewed, to the limit of its movement, the valve is turned off and this position is indicated in Fig. 2. The valve member 3 closes off both the inlet passageway 11 and the chamber 21. In full open position the parts are substantially as illustrated in Fig. 3, the valve member having been rotated counterclockwise to the position shown. A full flow of gas is now obtained through the inlet passageway 11, the port 5, bore 4 and outlet passageway 13. In this position a full charge of gas flows through the valve and the flame at the burner may be relatively high. Now to obtain a relatively small or simmering flame the valve member is turned further in a counterclockwise direction from the position shown in Fig. 3 to substantially that as shown in Fig. 4. At this time the inlet passageway 11 is closed, and a smaller volume of gas, as controlled by the needle valve 26, flows through the passageway 23, chamber 21 and thence through the port and bore of the plug to the outlet passageway. It will be noted that the dimension of the port 5, measured circumferentially of the plug, is greater than the distance between the inlet passageway 11 and the chamber 21, measured at the point where they communicate into the chamber 2. Thus as the valve member is rotated from the Fig. 3 position to the Fig. 4 position, the chamber 21 is opened before the passageway 11 is shut off. Thus the flow of gas to the burner is not discontinued throughout the full range of movement of the valve from "off" position to the Fig. 4 position.

The chamber 21 constitutes a reservoir for gas available for immediate discharge through the valve as the valve is opened for simmering condition. It will be appreciated that normally the gas is under pressure and the chamber is filled with such gas under the pressure.

Furthermore, the structure of the valve is such that the valve is safe for use from the standpoint of gas leakage or rather lack of gas leakage. For example, even if the cap 30 is lost or mislaid after the user has adjusted the simmering valve, the simmering valve 26 may be readily turned by the fingers to seat in the passageway 23, thus to positively close off any gas leakage.

The simplicity of the structure is also regarded as an important consideration; the valve plug member needs no machining operations, and is provided with no ports or passageways, other than the standard gas cock, since the port 5 controls both full and simmering passageways in the body. The enlargement 20 has but two passageways, namely, 23 and the chamber 21.

This valve structure may advantageously be used with a structure as shown in my Patent No. 2,030,150 of February 11, 1936. This structure is shown herein and briefly is as follows: Attached to the valve body is a cap 35 through which the stem extends, and a coil spring 36 is under the cap. This coil spring functions on a stop washer 37 non-rotatably associated with the cap or valve body, and having a stop member 40 lying in the path of the pin 8. The stop member has a quick lift cam face 41 and a slow lift cam face 42. As the valve is rotated from the Fig. 2 position to the Fig. 3 position, the pin strikes the quick lift cam face 41 and a substantial stopping action on the valve is obtained. The pin serves to limit extreme rotary movement of the rotary valve member by abutting against the valve body 5 in a well-known manner. Thus the valve may be operated to and from full open and closed positions between one fixed stop and the stop face 41. Additional turning pressure compresses the spring 36 as the valve rotates from the Fig. 3 position to the Fig. 4 position, the pin moving past the stop piece 40. On return or closing movement of the valve, the pin rides easily past the stop piece by reason of the slow lift cam face 42. The spring 36 also serves to hold the valve member on its seat, as the washer lies against the shoulder 7.

I claim:

A gas cock comprising, a valve body having a chamber constituting a valve seat, an inlet passageway entering the chamber from the side, an outlet passageway connecting into one end of the chamber, a gas conduit leading from the said inlet passageway angularly, a second inlet passageway into which the said gas conduit connects, said second inlet passageway connecting into the side of the valve seat chamber, a valve member seated in the valve chamber rotatably and having an axial bore which connects into the outlet passageway, said valve member having port means in its side and leading into the bore and arranged to disalign with and to align with both of the said first and second inlet passageways in different rotary positions of the valve member, an enlargement on the valve body having an opening extending therethrough and into the second inlet passageway, the said opening and said conduit opening into the second inlet gas passageway at substantially diametrically opposite points, the end of said gas conduit which opens into the second inlet passageway constituting a valve seat, and an adjustable needle valve threaded in the said enlargement and having an exterior portion which is engageable for operation, said needle valve extending substantially across the second inlet passageway and arranged to meter the said conduit and to seat upon the valve seat and close the said conduit to stop flow of gas into the second inlet passageway and into said opening in the enlargement around the needle valve.

ERVIN H. MUELLER.